United States Patent [19]

Salter et al.

[11] Patent Number: 5,190,446

[45] Date of Patent: Mar. 2, 1993

[54] PUMP CONTROL METHOD AND POPPET VALVE THEREFOR

[75] Inventors: Stephen H. Salter, East Lothian; William H. S. Rampen, Edinburgh, both of Scotland

[73] Assignee: The University Court of the University of Edinburgh, Edinburgh, Scotland

[21] Appl. No.: 671,827

[22] PCT Filed: Sep. 28, 1989

[86] PCT No.: PCT/GB89/01146

§ 371 Date: Mar. 25, 1991

§ 102(e) Date: Mar. 25, 1991

[87] PCT Pub. No.: WO90/03519

PCT Pub. Date: Apr. 5, 1990

[30] Foreign Application Priority Data

Sep. 29, 1988 [GB] United Kingdom ............... 8822901

[51] Int. Cl.[5] .................. F04B 49/04; F04B 49/06
[52] U.S. Cl. ................................ 417/297; 417/298
[58] Field of Search ................ 417/290, 297, 298; 251/65, 12; 137/516.11, 516.13, 516.15, 516.17, 516.19, 516.21, 522

[56] References Cited

U.S. PATENT DOCUMENTS

| | | | |
|---|---|---|---|
| 2,431,769 | 12/1947 | Parker | 137/514 |
| 2,785,638 | 3/1957 | Moller. | |
| 3,529,806 | 9/1967 | Kozel | 251/129.21 |
| 4,241,714 | 12/1980 | Knape et al. | 417/298 |
| 4,825,904 | 5/1989 | Grau et al. | 251/65 |

FOREIGN PATENT DOCUMENTS

| | | |
|---|---|---|
| 0084070 | 7/1983 | European Pat. Off. . |
| 0102780 | 11/1983 | European Pat. Off. . |
| 3312054 | 11/1984 | Fed. Rep. of Germany . |
| 288540 | 5/1953 | Switzerland . |
| 1335194 | 10/1973 | United Kingdom . |
| 8705981 | 10/1987 | World Int. Prop. O. . |

Primary Examiner—Richard A. Bertsch
Assistant Examiner—Alfred Basichas
Attorney, Agent, or Firm—Dann, Dorfman, Herrell and Skillman

[57] ABSTRACT

Displacement control of a multi-piston fluid pump is achieved by real time control of electrically selectable inlet poppet valves in one or more of the cylinders. Microprocessor control permits desired variable output characteristics to be matched. An electrically actuable poppet valve using an annular permanent magnet to latch to a solenoid is described.

16 Claims, 2 Drawing Sheets

PUMP CONTROL METHOD AND POPPET VALVE THEREFOR

BACKGROUND OF THE INVENTION

This invention relates to a method for electrically controlling the actuation of a reciprocating fluid (i.e. gas or liquid) pump, preferably a pump with static pumping chambers and more preferably a multi-piston fluid pump. The invention also extends to an electrically selectable hydraulic poppet valve for employment in the method.

Reciprocating multi-chamber fluid pumps are well known and generally comprise a plurality of static pumping chambers each equipped with a poppet valve to control inlet of fluid into the chamber (on an inlet stroke) for subsequent pressurisation therein on a discharge stroke. Common embodiments of reciprocating multi-chamber pump have a plurality of piston-in-cylinder modules disposed about an annular lobed cam, eccentric or swash plate, carried by a drive shaft. As the drive shaft is rotated to cause rotation of the lobed cam or eccentric, the piston-in-cylinder modules are sequentially operated to cause hydraulic fluid to be pumped from a low-pressure inlet manifold through the poppet valve in each module to a high-pressure delivery manifold. By enabling or disabling one or more of the pumping chambers (or modules), variable stepped changes in the displacement of the pump can be achieved.

One previously proposed method of disabling a piston-in-cylinder module is to hold open mechanically the inlet valve to the cylinder of the module so that the fluid drawn into the cylinder on the inlet stroke is pumped back into the low-pressure inlet manifold throughout the delivery stroke rather than to the high-pressure delivery side of the pump. In this way, for example, a pump having "n" cylinders and means to independently enable or disable each of the piston and cylinder modules, could offer "n" stepped levels of displacement. It will be appreciated that with such an arrangement, the variations in displacement are fixed depending simply on the number of piston and cylinder modules which are utilised at any one time.

Such previously proposed mechanical arrangements have significant disadvantages in that they have proved to be relatively slow and noisy in operation as well as being limited in the degree of displacement variation which can be achieved.

One aim of the present invention is to obviate or mitigate the aforesaid disadvantages. A further aim is to provide a method for the real time control of the displacement of a multi-chamber reciprocating fluid pump having individually electrically controllable poppet valves serving as inlet valves to at least some of the pumping chambers.

SUMMARY OF THE INVENTION

According to one aspect of the present invention a method of controlling the displacement of a reciprocating fluid pump having a plurality of pumping chambers each of which has an inlet valve with a valve member movable to an open limit condition to admit low pressure fluid to the chamber on an inlet stroke of the pump, and movable to a closed limit condition to prevent fluid again flowing past the valve member and to be ejected at high pressure from the chamber on a discharge stroke of the pump, and electromagnetic means to control the movement of the valve members between limit conditions, is characterised in that each valve member is a poppet valve and in that the electromagnetic mens comprises a solenoid coil fixedly mounted in a casing of the valve and a magnet on the valve member, coacting with the coil to move the valve into at least one of its limit conditions on electrical energisation of the coil.

Preferably each pumping chamber is a piston-in-cylinder module and the permanent magnet is annular and surrounds a stem of the poppet valve.

Conveniently, electrical energisation of the solenoid coil is controlled by a microprocessor unit in response to at least one of output pressure of fluid and output displacement volume of fluid leaving the pump. Energisation of the solenoid coil can be used to move the valve member to its closed limit condition, de-energisation allowing the valve member to move under the influence of fluid flow-induced forces into its open limit condition.

Preferably, the sealing surface of the valve member is formed on a bulbous head of generally elliptical shape with a part spherical area defining the sealing region, the head being connected to a tubular stem, and fluid flow in the open condition of the valve member being through the tubular stem and being smooth and devoid of sharp transitions.

In its valve aspect the invention specifies a valve element having an elongated hollow stem and associated bulbous head, a permanent magnet surrounding and being connected to the stem to move in the elongate direction of the stem. Desirably the hollow stem has internally chamfered ends and is made of non-ferromagnetic material. A second solenoid coil may be provided to draw the annular magnet away from the first solenoid coil and to latch the valve in the open limit condition.

The method of the invention allows a reciprocating multi-chamber pump (usually of five or more piston-in-cylinder modules) to be controlled in real time to match a predetermined demand characteristic which can be varied smoothly over wide ranges. By sensing the actual operating characteristics of each chamber during each rotational cycle of the pump and comparing this with the predetermined demand characteristic during each cycle (or at (say) BDC (bottom dead centre) of the piston in a piston-in-cylinder module) the output of the pump can be accurately matched to what has previously been determined will be required.

The predetermined demand characteristics can include pump displacement and noise emission.

BRIEF DESCRIPTION OF THE DRAWINGS

An embodiment of the present invention will now be described, by way of example, with reference to the accompanying drawings, in which.

DESCRIPTION OF PREFERRED EMBODIMENTS

Figure 1:
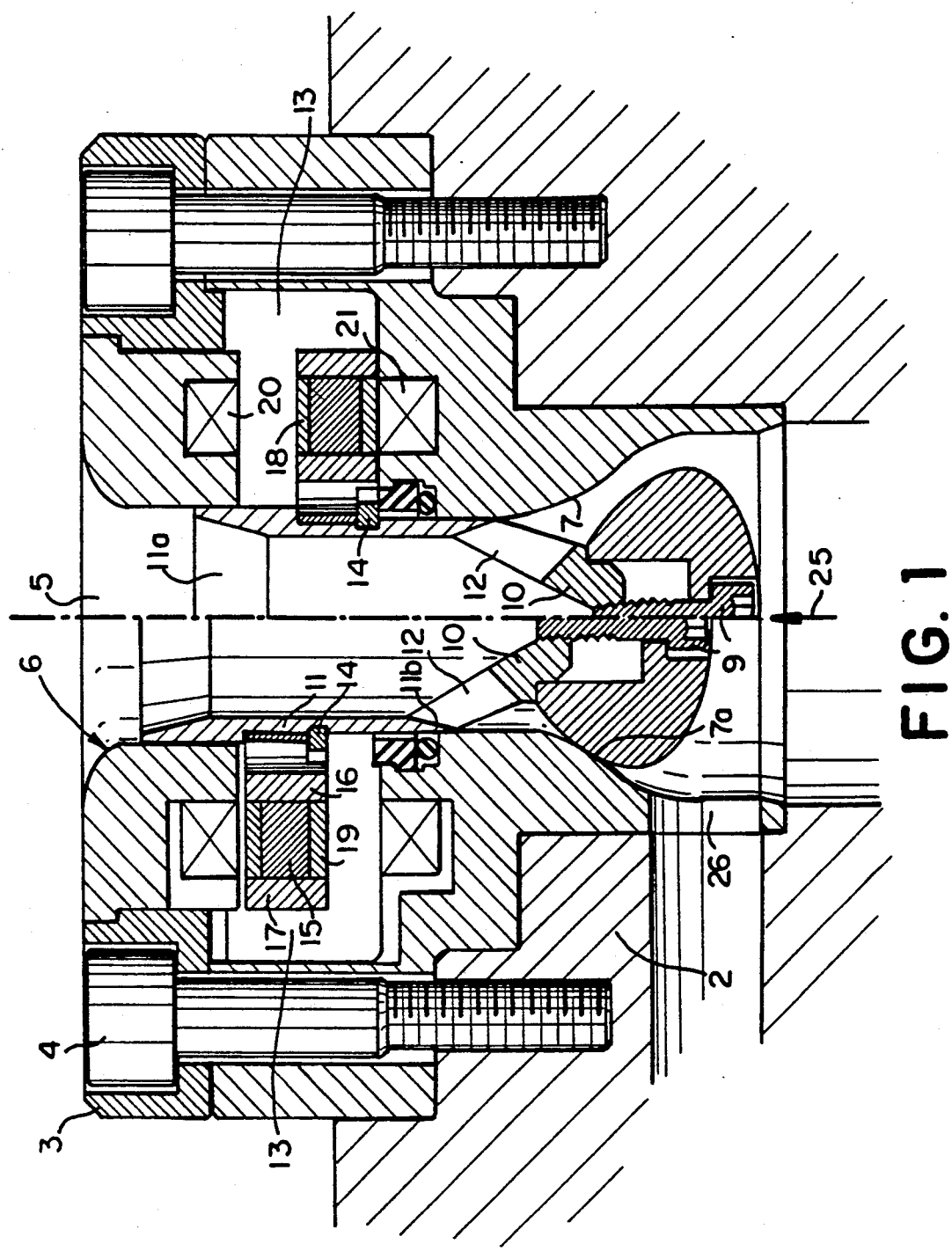
FIG. 1 is a vertical sectional view of an electrically selectable poppet valve for a multi-piston hydraulic pump.

The left-hand half of FIG. 1 illustrates the poppet valve in the closed position while the right-hand half illustrates the valve in the open position.

Referring to FIG. 1, a valve suitable for a multi-piston hydraulic pump (such as an axial piston or ring-cam hydraulic pump) comprises a steel valve shell 1 which is adapted to be fixedly mounted within a cylinder body 2 of the pump through the intermediary of a valve end cap 3 and associated cap screws 4.

The valve shell 1 has a bore 5 therethrough through which pumped hydraulic fluid can pass from a profiled inlet 6 to a profiled outlet 7. The profiles of the inlet to and outlet from the bore 5 are calculated to result in low fluid drag on passage therethrough and the profiled outlet 7 includes a valve seat 7a for a poppet valve 8 made of surface-hardened steel.

The poppet valve 8 is of bulbous (i.e. part-elliptical) form and is securely attached by means of a cap screw 9 to a rigid but hollow support 10. To ensure good sealing even if there is some misalignment of the bulbous head in the outlet 7, the bulbous head can be given a part spherical area in the vicinity of the sealing region of the member which seals with the valve seat 7a. The support 10 is, in turn, integrally connected to a non-ferromagnetic (e.g. phosphor bronze) flow tube 11 by means of a thin septum constituted by rigid arms 12 which are angularly spaced from each other to permit relatively unrestricted passage of hydraulic fluid into and out of the tube 11. The upstream and downstream ends of the flow tube 11 are internally chamfered at 11a and 11b respectively.

The flow tube 11 with its associated poppet valve 8 is axially slidable relative to the valve bore 5 between the two limit positions shown on the left and on the right.

An axially movable, bistable magnetic latch 13 is housed within a chamber 13a defined within the valve shell 1. The latch 13 is fixedly connected to the flow tube 11 by means of a spring circlip 14 and surrounds the latter.

The magnetic latch 13 is of annular form having a core 15 of a magnetic material such as bonded or sintered rare earth material or neodymium-boron. The core 15 is enclosed on its radially inner and outer sides by ferromagnetic pole rings 16 and 17 respectively and on its upper and lower faces by non-ferromagnetic guard rings 18 and 19 respectively. The core 15 is desirably magnetised in the radial direction (e.g. so that the inner cylinarical surface thereof is the South pole and the outer cylinder surface is the North pole).

The latch 13 is axially movable within its chamber 12 in a bistable manner under the influence of upper and lower electromagnetic solenoid coils 20 and 21.

On appropriate electrical energisation of coil 20 or of both of the coils 20 and 21, the magnetic latch 13 is attracted to the energised coil 20 so that the poppet valve 8 is moved into the closed or "enabled" position as shown in the left-hand side of FIG. 1 when magnetic lines link the upper coil 20 and the core 15 but is held in the open or "disabled" position as shown on the right-hand side of FIG. 1 when magnetic flux lines link the lower coil 21 and the core 15. In the closed position of the valve, hydraulic liquid flowing upwardly in the direction of the arrow 25 is pumped into the high-pressure delivery side of the pump via a discharge port 26.

During each intake stroke of the piston, the poppet valve 8 is moved under the influence of fluid flow into the open position where it latches. In this position liquid can flow backwards and forwards through the annular passage defined between the bulbous head of the valve 8 and the outlet 7, the hydraulic liquid being pumped back into the low-pressure inlet manifold as the piston makes its discharge stroke with very little loss of energy compared to that which would have been transferred to the liquid had the valve 8 been closed.

As the poppet valve 8 and its associated magnetic latch 13 move into the open position, the latch 13 can be made to contact a resilient end stop ring before it contacts the coil 21 and its surrounding surfaces. Such a resilient end stop ring can be used to cushion movement of the latch 13 into its fully open position.

The valve as described above has a response time which is fast enough so that it can be closed at the appropriate moment in a pumping cycle of a multi-piston hydraulic pump (e.g. a ring-cam pump) and this permits the pump to be operated with improved performance, particularly with respect to control of pump displacement.

The lower solenoid coil 21 augments the action of the upper coil 20 during the movement of the valve 8 into its closed position, the upper coil 20 attracting the latch 13 and the lower coil 21 repelling it.

Although a lower solenoid coil 21 is shown in FIG. 1 this can be dispensed with, and electromagnetic operation achieved with just the one coil 20 to hold the valve member latched in the closed position. Latching in the open position is achieved by the creation of a closed "lower" flux loop through the core 15 of the magnet and the adjacent part of the shell 1 of the valve. When the coil 20 is energised the latching flux holding the valve 8 open is diverted into a new circuit which includes the coil 20 so that the closed "lower" flux loop is destroyed in favour of an "upper" flux loop that embraces the core 15 and draws the annular magnet up towards the coil 20. Return of the valve member 8-11 to its open condition will occur on the basis of liquid flow-induced forces when the piston commences its next inlet stroke if the solenoid coil 20 is then deenergised (or energised with a polarity repelling the core 15).

By virtue of the present invention which involves the electrical control of the inlet valves of a reciprocating hydraulic pump, significant and advantageous consequences arise which have not hitherto been possible with pumps having mechanically controlled valves and this will now be described with reference to FIG. 2.

Figure 2:
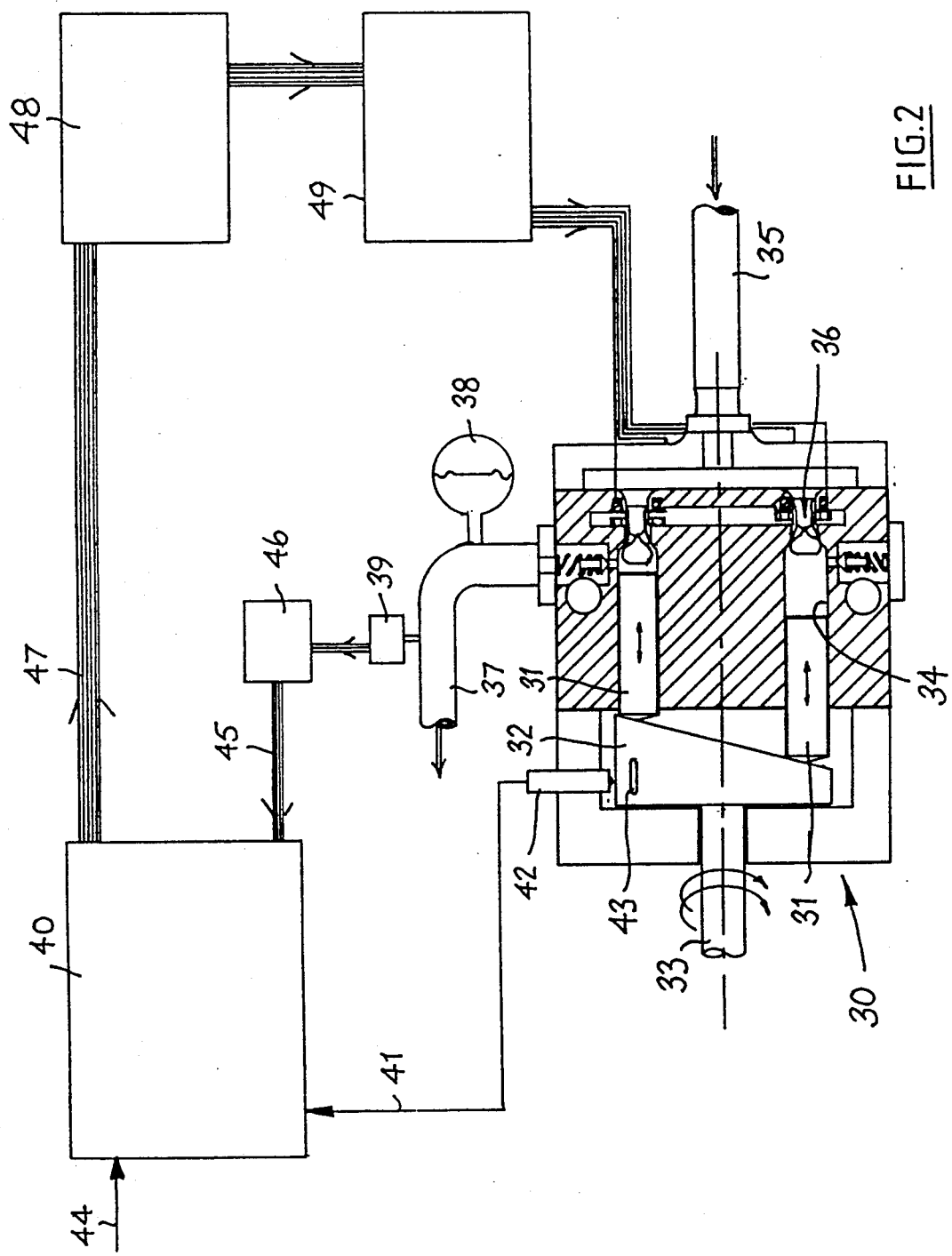
FIG. 2 is a schematic view of an axial piston pump incorporating poppet valves of the kind shown in FIG. 1 together with control equipment for the several poppet valves for performing the control method of this invention.

FIG. 2 shows a multi-piston pump 30 having a ring of pistons 31 driven by cam 32 as a driven cam shaft 33 rotates. Each piston 31 reciprocates in its cylinder 34 under the influence of the rotating cam 32, drawing hydraulic liquid into the cylinders 31 from a low pressure manifold 35 via an electromagnetically controlled valve 36 of the kind shown in FIG. 1 during each inlet stroke. At BDC each piston 31 reverses direction of movement to start its delivery stroke, and if the respective valve 36 is closed, the hydraulic liquid is forced through the discharge port 26 into a high pressure duct 37.

Mounted on the duct 37 is an output accumulator 38 (to smooth out pressure pulses in the discharge from the pump) and a pressure measuring transducer 39.

In operation of the pump, a micro-processor unit 40 is used to control the opening and closing of the valves 36. A "once-per-revolution" shaft trigger signal is generated on a line 41 (by a transducer 42 sensing passage of a "mark" 43 on the cam 32) and is fed to the unit 40 with a digital input on line 44 related to pump output demand and a digital input on line 45 from an analogue/digital converter 46 connected to the transducer 39.

The unit 40 provides a digital output on line 47 which controls a bank of solenoid drivers 49 via an isolating stage 48 (which can contain opto-isolators and transistor drivers).

The microprocessor control unit 40 could contain several built-in algorithms which enable the unit to compare the pump system demand characteristics with system feedback and which outputs a signal on actuation of a cylinder and which causes the next cylinder to reach BDC to become enabled should the system require its displacement of fluid. This algorithm would desirably be tempered with a maximum rate of change algorithm which would prevent sudden surges. Thus, the actual operating displacement characteristics of the pump system are electromagnetically modified in accordance with the desired demand displacement characteristics. The enabling pulse would then be sent to the solenoid driver 49 after being timed by the noise algorithm in order to just close the valve 36 of a module by the time the piston 31 in that module reached BDC. In this way the shock wave generated by late valve closing is reduced.

The hardware illustrated in FIG. 2 can operate for example in two different modes, a flow control mode and a pressure control mode.

Flow Control Mode

The unit 40 keeps a running account of the displacement demand (from either a fixed level or an external input such as an operator joystick) and the displacement produced by the pump 30. At each cylinder enabling opportunity the unit 40 decides whether the demand foreseen at the time of maximum effectiveness of the current cylinder justifies its being enabled. This occurs if the displacement account will be at a deficit of more than half of a cylinder. The accumulator 38 is sized so that a half cylinder error will cause less than 10% variation in line pressure. This control method is, in itself, open loop since no feedback is used. Feedback can be applied by positioning a summing junction prior to the demand input 44 of the micro-processor unit 40.

Pressure Control Mode

In this situation the unit 40 attempts to maintain the required pressure on the output line irrespective of the demand function. What it is actually doing is trying to keep the accumulator volume as close to the zero error state as possible. To know the pumping requirements the system has to calculate the flow from the output to the load. This can be done by measuring the system pressure at two consecutive cylinder decision intervals. The change in pressure equates to a change in accumulator volume which indicates the displacement contribution from the accumulator 38 to the system. The displacement delivered by the pump 30 during the time interval is calculated from the records of the previously enabled cylinders. The output flow is the sum of pump and accumulator flow (since the flow is incompressible for these purposes).

The output flow demand, the displacement from the committed cylinders and the displacement to the accumulator (to restore it to the zero error position) are then combined to allow a decision on whether to enable the current cylinder.

The microprocessor unit 40 can be equipped with different inputs including, for example:

1. Pump system demand characteristics for example from a potentiometer, a throttle pedal (in the case of a pump used for vehicle drive), or a digital set-point.

2. Pump system feed back signals, for example from a motor speed sensor.

3. Noise sensor, for example an accelerometer, located on the pump casing.

It will be readily appreciated from the above that, because of the ability to control the valve 36 of each piston and cylinder module of a pump within every cycle of the pump, a pump, particularly a pump with a substantial number of cylinders, is capable of more or less infinite variation in displacement. This differs from the stepped type of variation possible in pumps heretofore.

It will, for example, be possible to programme the operation of a pump so that its output varies from cycle to cycle. Alternatively, a pump can be divided into a number of independently operable sections each comprising a plurality of cylinders. Each section can be independently controlled as to displacement and used for operating separate machines.

We claim:

1. A method of controlling the displacement of a reciprocating fluid pump connected to a high pressure duct and having a plurality of pumping chambers each of which has an inlet valve with a valve member movable to an open limit condition to admit low pressure fluid to the chamber on an inlet stroke of the pump, and movable to a closed limit condition to prevent fluid again flowing past the valve member and for a displacement volume of fluid to be ejected at high output pressure from the chamber into the high pressure duct on a discharge stroke of the pump, and electromagnetic means to control the movement of the valve members between limit conditions, characterised in that each valve member is a poppet valve and in that the electromagnetic means comprises a solenoid coil fixedly mounted in a casing of the valve and a magnet on the poppet valve coacting with the coil to move the valve into at least one of its limit conditions on electrical energisation of the coil, and in that electrical energisation of the solenoid coil is controlled by a microprocessor unit in response to output displacement volume of fluid ejected from the pump, which energisation of the solenoid coil is used to move the valve member to its closed limit condition, de-energisation allowing the valve member to move under the influence of fluid flow-induced forces into its open limit condition, which method further includes the step of programming the microprocessor unit to enable or disable the next chamber to pump on the basis of the difference between a running account of the displacement volume demanded and the actual previous displacement volume of the pump, the decisions being projected forward in time so as to move the inlet valve of the next chamber to pump to its closed condition at the at the commencement of a discharge stroke in that chamber if the actual previous displacement volume requires the volume contribution of that chamber to meet the displacement volume demanded.

2. A method of controlling the displacement of a reciprocating fluid pump connected to a high pressure duct and having a plurality of pumping chambers each of which has an inlet valve with a valve member movable to an open limit condition to admit low pressure fluid to the chamber on an inlet stroke of the pump, and movable to a closed limit condition to prevent fluid again flowing past the valve member and for a displacement volume of fluid to be ejected at high output pressure from the chamber into the high pressure duct on a discharge stroke of the pump, and electromagnetic means to control the movement of the valve members between limit conditions, characterised in that each valve member is a poppet valve and in that the electromagnetic means comprises a solenoid coil fixedly mounted in a casing of the valve and a magnet on the poppet valve coacting with the coil to move the valve into at least one of its limit conditions on electrical energisation of the coil, in that electrical energisation of the solenoid coil is controlled by a microprocessor unit in response to at least one of output pressure of fluid in the high pressure duct and output displacement volume of fluid ejected from the pump, and in that energisation of the solenoid coil is used to move the valve member to its closed limit condition, de-energisation allowing the valve member to move under the influence of fluid flow-induced forces into its open limit condition.

3. A method of controlling the displacement of a reciprocating fluid pump connected to a high pressure duct and having a plurality of pumping chambers each of which has an inlet valve with a valve member movable to an open limit condition to admit low pressure fluid to the chamber on an inlet stroke of the pump, and movable to a closed limit condition to prevent fluid again flowing past the valve member and for a displacement volume of fluid to be ejected at high output pressure from the chamber into the high pressure duct on a discharge stroke of the pump, and electromagnetic means to control the movement of the valve members between limit conditions, characterised in that each valve member is a poppet valve having a tubular stem and a bulbous head of generally elliptical shape, and in that the electromagnetic means comprises a solenoid coil coacting with the coil to move the valve into at least one of its limit conditions on electrical energisation of the coil, in that electrical energisation of the solenoid coil is controlled by a microprocessor unit in response to at least one of the output pressure of fluid in the high pressure duct and output displacement volume of fluid ejected from the pump, in that energisation of the solenoid coil is used to move the valve member to its closed limit condition, de-energisation allowing the valve member to move under the influence of fluid flow-induced forces into its open limit condition, in that each pumping chamber is a piston-in-cylinder module, the magnet being formed as an annulus and surrounding said tubular stem of the valve, and in that the sealing surface of the valve member is formed on said bulbous head of generally elliptical shape, fluid flow in the open condition of the valve member being through the tubular stem and being smooth and devoid of sharp transitions.

4. An electrically selectable hydraulic poppet valve comprising a valve shell having a bore for the passage of fluid therethrough, a valve seat defined in said bore, a valve element movable into and out of engagement with the valve seat to control passage of fluid through the bore, and electromagnetic actuating means for controlling the movement of the valve element relative to the valve seat, characterised in that the electromagnetic actuating means comprises a solenoid coil and cooperating permanent magnet, that the valve element has an elongate hollow stem slidable in said bore and an associated bulbous head of generally elliptical shape, which bulbous head seals to the valve seat over a sealing surface thereof, fluid flow in the open limit condition of the valve element occurring through the hollow stem and past the sealing surface, and around the bulbous head, the flow path being smooth and devoid of sharp transitions, whereby the electromagnetic actuating means is used to close the bulbous head to the valve seat but fluid flow-induced forces act to move the head away from the valve seat when the electromagnetic actuating means is not actuated.

5. An electrically selectable hydraulic poppet valve comprising a valve shell having a bore for the passage of fluid therethrough, a valve seat defined in said bore, a valve element movable into and out of engagement with the valve seat to control passage of fluid through the bore, and electromagnetic actuating means for controlling the movement of the valve member relative to the valve seat, characterised in that the actuating means comprises a solenoid coil and cooperating annular permanent magnet, that the valve element has an elongate hollow stem and associated bulbous head which seals to the valve seat, that the permanent magnet is connected to and surrounds the valve stem and moves along the length of the bore in the elongate direction of the stem, and that the hollow stem has internally chamfered ends and is made of non-ferromagnetic material.

6. A valve as claimed in claim 5, characterised in that the annular magnet is magnetised in the radial direction.

7. A valve as claimed in claim 6, characterised in that the solenoid coil is disposed in the valve shell whereby when it draws the annular magnet towards it on energisation of the coil, the bulbous head engages the valve seat.

8. A valve as claimed in claim 7, in which a second solenoid coil is provided to augment the action of the first solenoid coil in moving the valve element into contact with the valve seat.

9. A method as claimed in claim 1, including the step of programming the microprocessor to monitor the output pressure of the ejected fluid and to enable or disable the next chamber to pump on the basis of maintaining a required pressure of fluid ejected from the pump.

10. A method of controlling the displacement of a reciprocating fluid pump connected to a high pressure duct and having a plurality of pumping chambers each of which has an inlet valve with a valve member movable to an open limit condition to admit low pressure fluid to the chamber on an inlet stroke of the pump, and movable to a closed limit condition to prevent fluid again flowing past the valve member and for a displacement volume of fluid to be ejected at high output pressure from the chamber into the high pressure duct on a discharge stroke of the pump, and electromagnetic means to control the movement of the valve members between limit conditions, characterised in that each valve member is a poppet valve and in that the electromagnetic means comprises a solenoid coil magnet coacting with the coil to move the valve into at least one of its limit conditions on electrical energisation of the coil, and in that electrical energisation of the solenoid coil is controlled by a microprocessor unit in response to output pressure of fluid in the high pressure duct, said method including the step of connecting an output accumulator to the high pressure duct to smooth out pressure pulses in the high pressure duct, and programming the microprocessor to maintain the volume of fluid in the accumulator as close to a zero error state as possible, whereby the microprocessor monitors the next chamber to pump on the basis of maintaining a required pressure of fluid ejected from the pump.

11. A method of controlling the displacement of a reciprocating fluid pump having a plurality of pumping chambers each of which has an inlet valve with a poppet valve movable to an open limit condition to admit low pressure fluid to the chamber on an inlet stroke of the pump, and movable to a closed limit condition to prevent fluid again flowing past the poppet valve and to be ejected at high pressure from the chamber on a discharge stroke of the pump, and electromagnetic means to control the movement of the poppet valve between limit conditions comprising a solenoid coil fixedly mounted in a casing of the valve and a magnet on the poppet valve coacting with the coil to move the poppet valve into at least one of its limit conditions on electrical energisation of the coil;

energising the coil to move the poppet valve to its closed limit condition and de-energising the coil to allow the poppet valve to move under the influence of fluid flow-induced forces into its open limit condition.

12. A method of controlling the displacement of a reciprocating fluid pump having a plurality of pumping chambers each of which is a piston-in-a-cylinder module and has an inlet valve with a valve member movable to an open limit condition to admit low pressure fluid to the chamber on an inlet stroke of the pump, and movable to a closed limit condition to prevent fluid again flowing past the valve member and for a displacement volume of fluid to be ejected at high output pressure from the chamber into the high pressure duct on a discharge stroke of the pump, and electromagnetic means to control the movement of the valve members between limit conditions comprising a solenoid coil fixedly mounted in a casing of the valve and a magnet on the poppet valve coacting with the coil to move the valve into at least one of its limit conditions on electrical energistation of the coil;

constituting each valve member a poppet valve having a tubular stem and a bulbous head of generally elliptical shape forming a sealing surface, and directing fluid flow in the open limit condition of the valve member through the tubular stem, the flow being smooth and devoid of sharp transitions.

13. An electrically selectable hydraulic poppet valve comprising a valve shell having a bore for the passage of fluid therethrough, a valve seat defined in said bore, a valve element movable into and out of engagement with the valve seat to control passage of fluid through the bore, and electromagnetic actuating means for controlling the movement of the valve member relative to the valve seat, said actuating means comprising a solenoid coil and a cooperating annular permanent magnet, said valve element having an elongate hollow stem made of non-ferromagnetic material and an associated bulbous head which seals to the valve seat, and said permanent magnet being connected to and surrounding the stem and moving in the elongate direction of the stem.

14. A valve as claimed in claim 13, characterised in that the annular magnet is magnetised in the radial direction.

15. A valve as claimed in claim 14, characterised in that the solenoid coil is disposed in the valve shell whereby when it draws the annular magnet towards it on energisation of the coil, the bulbous head engages the valve seat.

16. A valve as claimed in claim 15, in which a second solenoid coil is provided to augment the action of the first solenoid coil in moving the valve element into contact with the valve seat.

* * * * *